(12) United States Patent
Chen et al.

(10) Patent No.: US 6,359,039 B1
(45) Date of Patent: Mar. 19, 2002

(54) MIXING BARBITURIC ACID-MODIFIED BMI WITH MEK SOLUTION OF EPOXY RESIN AND ELASTOMER

(75) Inventors: Chih-Chiang Chen; Jing-Pin Pan; Shur-Fen Liu, all of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/628,061

(22) Filed: Jul. 25, 2000

Related U.S. Application Data

(63) Continuation of application No. 09/067,972, filed on Apr. 28, 1998, now abandoned.

(51) Int. Cl.[7] .............................. C08K 5/07; C08K 5/09; C08L 63/02; C08L 63/04
(52) U.S. Cl. ..................... 523/454; 523/455; 525/113; 525/114; 525/119
(58) Field of Search .................................. 525/113, 114, 525/119; 523/454, 455

(56) References Cited

U.S. PATENT DOCUMENTS

| | | | | |
|---|---|---|---|---|
| 4,816,531 A | * | 3/1989 | Young ....................... | 525/502 |
| 4,960,860 A | * | 10/1990 | Saito et al. .................. | 528/353 |
| 5,041,519 A | * | 8/1991 | Pan et al. .................... | 528/322 |
| 5,189,116 A | * | 2/1993 | Boyd et al. .................. | 525/423 |
| 5,268,432 A | * | 12/1993 | Pan et al. .................... | 525/423 |
| 5,326,794 A | * | 7/1994 | Pan et al. .................... | 525/502 |
| 5,364,700 A | * | 11/1994 | Domeier ..................... | 525/282 |

FOREIGN PATENT DOCUMENTS

| | | | | |
|---|---|---|---|---|
| JP | 62-1297 A | * | 1/1987 | |
| JP | 63-186787 A | * | 8/1988 | |

* cited by examiner

Primary Examiner—Robert E. L. Sellers
(74) Attorney, Agent, or Firm—W. Wayne Liauh

(57) ABSTRACT

An epoxy based adhesive composition contains: (i) a barbituric acid-modified bismaleimide; (ii) an epoxy resin selected from the group consisting of tetraglycidylmethylenedianiline, diglycidyl ortho-phthalate, diglycidyl ether of bisphenol A, polyglycidyl ether of novolac, and epoxy cresol novolac; (iii) an elastomer such as a carboxylated acrylontrile rubber containing between 19 and 41 wt % of acrylontrile; (v) a hardening agent and (vi) a catalyst.

8 Claims, No Drawings

MIXING BARBITURIC ACID-MODIFIED BMI WITH MEK SOLUTION OF EPOXY RESIN AND ELASTOMER

This application is a continuation of application Ser. No. 09/067,972 filed Apr. 28, 1998 and abandoned.

FIELD OF THE INVENTION

The present invention relates to a modified epoxy-resin-based composition which can be used as a high-performance adhesive. More specifically, the present invention relates to an adhesive composition which comprises a specially formulated epoxy resin composition and which exhibits excellent chemical and heat resistance and long-time storage stability, and thus can be advantageously used in high density IC packaging processes. The present invention also relates to improved IC packages that contain a specially formulated epoxy-resin-based adhesive composition so as to provide improved chemical and heat stability.

BACKGROUND OF THE INVENTION

The trend in the consumers electronics industry is to develop products that are ever increasingly smaller, more powerful, and providing more features. As a result, tremendous pressure is imposed upon IC manufacturers to search for every possible incremental improvement that may increase the density of an IC package, while, at the same time, reducing its dimension, i.e., making the IC product thinner, shorter, lighter, and smaller, and, if possible, also reducing its cost.

Currently, two IC packing processes are most commonly employed: The tape automated bonding (TAB) method and the flexible printed circuit board (FPC) method. The former is typically used in the manufacturing of IC components for use in desktop computers, consumer electronics, liquid crystal displays (LCD), IC cards, etc. And the latter is typically used in the manufacturing of IC components for use in the automobile and communication industries, notebook computers, leadframe tapes, etc. With either the TAB or the FPC process, electronic elements are soldered onto the copper foil provided on the printed circuit board. The significant increase in the IC density causes substantial amounts of heat to be generated during operation. Such a large heat dissipation, and thus the temperature of the IC chips, will be even further increased in light of the proliferation multi-layered IC devices.

Heat dissipation typically has not been considered a serious problem since the substrates of most IC packages are made from polyimide, which is a very heat-resistant resin. However, weak spots have been noticed with respect to the adhesives that bond the conductive electronic elements to the polyimide based substrate. Most commonly, acrylic or epoxy resins are used as such adhesive. The heat resistance, or thermal stability, of acrylic or epoxy resins are not in par with polyimide. While the thermal characteristics of epoxy resin itself can be improved by modifying the composition of the epoxy resin according to several prior art teachings, such a modification of the epoxy composition has been known to result in a sacrifice in the adhesion (i.e., bonding) characteristics or other properties of the epoxy resin, and, thus, is highly undesired.

The inventors of the present invention have discovered that, by including bismaleimide into an epoxy resin based adhesive composition, the heat resistance of the resultant adhesive composition can be substantially increased. However, they also found out that the inclusion of bismaleimide created an unexpected problem in that bismaleimide exhibited long-time stability problems with elastomers such as CTBN (carboxylated acrylontrile rubber). Elastomers are added in the adhesive composition as a flexibilizer. The varnish that contained bismaleimide and an elastomer exhibited serious phase separation problems during storage.

U.S. Pat. No. 5,041,519, the content thereof is incorporated herein by reference, discloses an improved epoxy resin composition which exhibited high glass transition temperature and good toughness. The epoxy resin composition disclosed in the '519 patent comprises a specific epoxy resin, a bismaleimide resin, and barbituric acid. While the epoxy composition of the '519 patent provided several improved physical and electrical properties, it was designed to be used as a substrate in IC packaging; it cannot be used, and was not expected to be used, as an adhesive.

U.S. Pat. No. 5,268,432, the content thereof is incorporated herein by reference, discloses a heat resistant adhesive composition comprising an admixture of a modified bismaleimide resin, a modified polyamide-imide and a solvent. The bismaleimide resin was modified by barbituric acid and the polyamide-imide was modified by an epoxy resin. The complexity of the process disclosed in the '432 patent underscores the difficulties and frustrations many searchers have experienced in attempting to develop an improved adhesive composition for today's IC packing use which must be chemically and thermally stability, and at the same time, provide improved or at least same degree of adhesion characteristics. Furthermore, as discussed above, there are compatibility problems that have been observed between bismaleimide resin and elastomers. This deprives semiconductor manufacturers from taking advantage of the excellent heat resistance of using bismaleimide based resin in preparing adhesives.

SUMMARY OF THE INVENTION

The primary object of the present invention is to develop an improved adhesive composition for use in high density IC packaging processes where heat dissipation is expected to be significant. More specifically, the primary object of the present invention is to develop an improved epoxy resin based adhesive composition which can provide improved thermal and chemical stability so that they can withstand high heat dissipation expected in the manufacturing of high density and/or multi-layered IC boards, while maintaining the excellent adhesive properties that are characteristic of many epoxy resins. Because IC product is an everyday consumers item, it is particularly preferred that the improvement can be made from modifications of existing products, so that the long term environmental and health effects of the underlying chemical components are well known and well documented. With the extremely short cycle of consumers electronics, a manufacturer cannot afford the long wait for the verdict on an unaccustomed chemical, or an unfamiliar chemical combination.

The present invention is the fruit of many years of continuous and dedicated efforts by the co-inventors aiming at developing a better adhesive composition which can be comfortably and readily accepted by IC manufacturers in fabricating high density IC packages. Unexpected results were observed by the co-inventors of the present invention when bismaleimide resin is modified with barbituric acid in preparing the adhesive composition. Their results showed that, when bismaleimide was replaced with the barbituric acid modified bismaleimide, not only the excellent heat resistance of bismaleimide was retained, the resultant varnish also exhibited excellent storage stability. The improved epoxy resin based adhesive composition can be most advantageously used in bonding microelectronic components onto a polyimide substrate in the preparation of high density IC packages. As discussed above, because of compatibility problems with elastomers, adhesives containing bismaleimide resin do not show good long-term stability.

The improved epoxy resin based adhesive composition comprises the following components:

(1) A barbituric acid (BTA) modified bismaleimide (BMI) or derivatives thereof

The bismaleimide for use in the present invention is represented by one the following formulas:

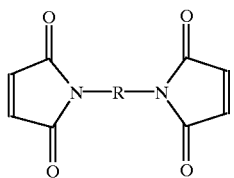

wherein R is $-(CH_2)_2-$, $-(CH_2)_6-$, $-(CH_2)_8-$, $-(CH_2)_{12}-$,

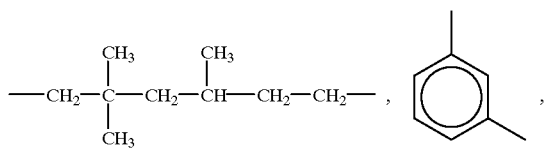

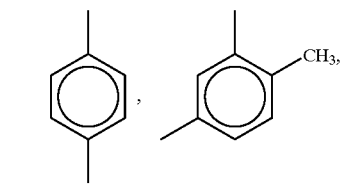

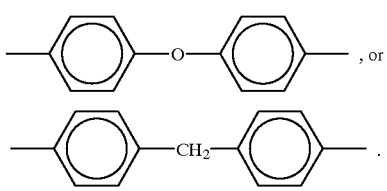

The barbituric acid (and its derivatives) that can be used to modified the bismaleimide is represented by one of the following formulas:

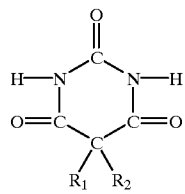

wherein $R_1$ and $R_2$ can be independently selected from the group consisting of:

—H, —$CH_3$, —$C_6H_5$, —CH($CH_3$)$_2$, —$CH_2$CH($CH_3$)$_2$, —$CH_2CH_2$CH($CH_3$)$_2$, and

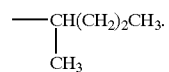

In preparing the barbituric acid-modified bismaleimide, about 1/20 to 1/3 mole of barbituric acid per mole of bismaleimide are mixed, in the presence of an appropriate solvent (a mixture of methyl ethyl ketone and γ-butyrolactone) at a solid content of 30~60 wt %, and reacted at about 100~130° C. for about 1~6 hours to complete the reaction.

(2) At least one epoxy resin selected from the group consisting of (a) tetraglycidylmethylenedianiline, (b) diglycidyl ortho-phthalate, (c) diglycidyl ether of bisphenol A, (d) polyglycidyl ether of novolac, and (e) epoxy cresol novolac.

(3) An elastomer as flexibilizer, such as carboxylated acrylontrile rubber (CTBN), polyester, acrylic, polyamide, or polyvinyl butyral.

(4) A hardening agent, which can be a mixture of methyltetrahydrophthalic anhydride (MTHPA) and ethylene glycol, DDS (diamino diphenyl sulfone), DDM (diamino diphenyl methene), BAPP (2,2'-biz(4-[4-aminophenoxyl] phenyl), ethylenediamine, m-phenylene diamine, trimellitic acid glycol, or polymercaptan, etc.

(5) A catalyst, which can be 1-benzyl-2-methylimidazole (1-$B_2$Mz) or 1-cyanoethyl-2-ethyl-4-methylimidazole (2-$E_4$Mn-CN).

(6) Methyl ethyl ketone (MEK).
(7) γ-butyrolactone.
(8) A surface active agent.

Other additives such as coupling agent, anti-foaming agents, UV-stabilizers, etc. can also be added to the adhesive composition of the present invention. In the final adhesive composition, it is preferred that the overall solid content is about 40~50 wt %.

DETAILED DESCRIPTION OF THE PREFERRED EMBODIMENT

The present invention discloses an improved adhesive composition for use in high density IC packaging processes where the problem heat dissipation can be expected to be significant. One of the key constraints of the present invention is that, because the end product is an everyday consumer item, the improvement must be made from existing products, so that their long term environmental and health effects are well documented and that the improved can be readily accepted by the IC manufacturing industry.

As it will be demonstrated below, an improved epoxy resin based adhesive composition has been developed based on modifications from a well-known product; it provides substantially improved thermal and chemical stability so that they can withstand high heat dissipation expected of high density and/or multi-layered IC boards, while, at the same time, it also maintains the excellent adhesive properties that are characteristic of many epoxy resins. The improved epoxy resin based adhesive composition of the present invention can be most advantageously used in bonding microelectronic components onto an polyimide substrate in the preparation of high density IC packages.

The improved epoxy resin based adhesive composition comprises the following components: (1) A barbituric acid (BTA) modified bismaleimide (BMI) or derivatives thereof; (2) at lease one epoxy resin selected from the group consisting of the tetraglycidyl methylenedianiline, diglycidyl ortho-phthalate, diglycidyl ether of bisphenol A, polyglycidyl ether of novolac, and epoxy cresol novolac; (3) carboxylated acrylontrile rubber (CTBN); (4) a hardening agent; (5) a catalyst, (6) methyl ethyl ketone (MEK) (g) γ-bytyrolactone; (7) a surface active agent. Other additives such as coupling agent, anti-foaming agents, UV-stabilizers, etc. can also be added to the adhesive composition of the present invention.

The process for preparing the epoxy resin based adhesive composition of the present invention is described as follows:

(1) Preparation of Barbituric Acid Modified Bismaleimide:

The bismaleimide for use in the present invention is represented by one the following formulas:

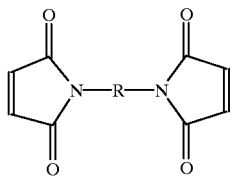

wherein R is $-(CH_2)_2-, -(CH_2)_6-, -(CH_2)_8-, -(CH_2)_{12}-,$

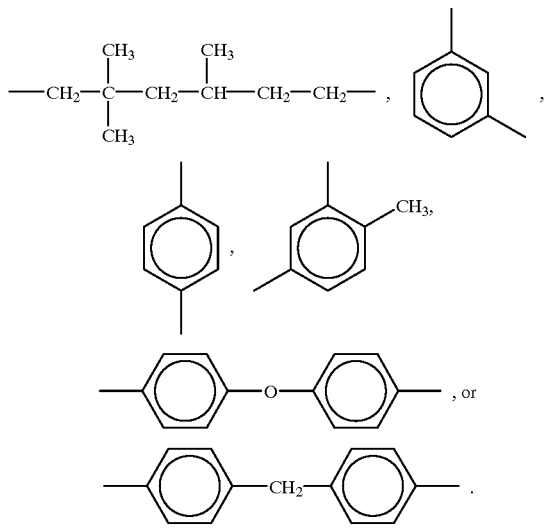

The barbituric acid (and its derivatives) that can be used to modify the bismaleimide is represented by one of the following formulas:

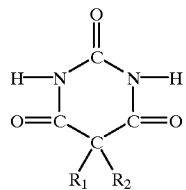

wherein $R_1$, and $R_2$, which can be the same or different, are respectively selected from the group consisting of: —H, —CH$_3$, —C$_6$H$_5$, —CH(CH$_3$)$_2$, —CH$_2$CH(CH$_3$)$_2$, —CH$_2$CH$_2$CH(CH$_3$)$_2$, and

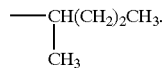

In preparing the barbituric acid-modified bismaleimide, about 1/20 to 1/3 mole of barbituric acid per mole of bismaleimide were mixed, in the presence of an appropriate solvent (a mixture of methyl ethyl ketone and γ-butyrolactone) at a solid content of 30~60 wt %, and reacted at about 100~130° C. for about 1~6 hours to complete the reaction.

(2) Preparation of the Epoxy Adhesive Composition:

An MEK solution was prepared which had a solid content of 30~70 wt % was prepared. The solid component contains 7~25 wt % of an elastomer, carboxylated acrylontrile rubber (CTBN) containing 19~41 wt % acrylontrile, 45~70 wt % of the epoxy resin described above, a hardening agent and a catalyst. The hardening agent was provided such that it had an equivalent ratio of 0.9~1.1 relative to the epoxy resin, and the amount of catalyst added was about 3~7 phr (parts per hundred parts resin). The MEK solution was mixed with the modified bismaleimide solution prepared in step (1) to form the final epoxy resin based adhesive composition, which had a solid content of about 40~50 wt %. The hardening agent can be a mixture of methyltetrahydrophthalic anhydride (MTHPA) and ethylene glycol, DDS (diamino diphenyl sulfone), DDM (diamino diphenyl methene), BAPP (2,2'-biz(4-[4-aminophenoxyl]phenyl), ethylenediamine, m-phenylene diamine, trimellitic acid glycol, or polymercaptan, etc. The catalyst can be 1-benzyl-2-methalimidazole (1-B$_2$Mz) or 1-cyanoethyl-2-ethyl-4-methylimidazole (2-E$_4$Mn-CN). Other elastomers including polyester, acrylic, polyamide, or polyvinyl butyral, can also be used in the present invention.

Other additives such as a surface active agent, a coupling agent, an anti-foaming agent, a UV-stabilizer, etc. can also be added to the adhesive composition of the present invention. This is well known in the art and will not be elaborated.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

EXAMPLE 1

The modified epoxy resin based adhesive composition of the present invention was prepared based on the procedure described above. First, 56.1 g bismaleimide and 7.1 g barbituric acid were dissolved in a solvent mixture containing 20.7 MEK and 83.0 g γ-butyrolactone and reacted at 130° C. for three hours. Then, 14.2 g of epoxy resin, 2.65 g of methyltetrahydrophthalic anhydride, 0.09 g of 1-cyanoethyl-2-ethyl-4-methylimidazole , and 42.24 g of carboxylated acrylontrile rubber (in 20 wt % MEK solution) were added to the reaction mixture to form the modified epoxy resin based adhesive composition.

The modified epoxy resin based adhesive composition was uniformly coated on a polyimide (PI) film and baked in an oven at 150° C. for 2~4minutes. Thereafter, a copper foil was laminated on the modified epoxy resin film coated on the PI film at a speed of 100 cm/min at 100° C. The final product was hardened at 180° C. for 1~4 hours to form a PI/adhesive/copper foil sandwiched product.

A copper circuit having a wire width of ⅛ inch was formed using the steps of forming a photoresist and a photomask, light exposure, development, wet etching, removing photoresist, etc. The final circuit was subject to a series of tests to evaluate their adhesion strength, heat resistance, and chemical resistance. Peel strength, which is an indication of the adhesion strength between the layers of the PI/adhesive composition/copper foil, was measured using a Shimadzu AG5000A pulling machine for a peeling test. The peeling speed was set at 25 mm/min. Heat resistance was measured using a soldering test, by which the PI/adhesive composition/copper foil was immersed into a 288° C. soldering bath for 1~5 minutes, then removed, dried, and tested for their adhesion strength. Chemical resistance was measured by immersing the PI/adhesive composition/ copper foil inside an MEK solvent at 25° C. for 10~50 minutes, then removed, dried, and tested for their adhesion strength. The test results are summarized in Table 1.

COMPARATIVE EXAMPLE 1

The procedure in Comparative Example 1 was identical to that in Example 1, except that the epoxy resin was not reacted with the modified bismaleimide. The test results are also summarized in Table 1.

TABLE 1

| | Peel Strength (lb/in) | |
|---|---|---|
| Test Condition | Example 1 | Comparative Example 1 |
| After soldering at 288° C. for 0 min | 9.8 | 10.1 |
| After soldering at 288° C. for 1 min | 9.7 | 7.6 |
| After soldering at 288° C. for 2 min | 9.2 | 5.3 |
| After soldering at 288° C. for 3 min | 8.9 | 3.7 |
| After soldering at 288° C. for 4 min | 8.3 | 2.1 |
| After soldering at 288° C. for 5 min | 7.1 | 1.1 |
| After immersion in MEK for 0 min | 9.8 | 10.1 |
| After immersion in MEK for 1 min | 9.8 | 7.0 |
| After immersion in MEK for 2 min | 9.4 | 5.1 |
| After immersion in MEK for 3 min | 8.6 | 3.2 |
| After immersion in MEK for 4 min | 7.8 | 2.0 |
| After immersion in MEK for 5 min | 6.9 | 1.0 |

Table 1 clearly shows the superior advantages of the modified epoxy resin based adhesive composition of the present invention, especially with respect to chemical and heat resistance. If should be noted that, if a different epoxy resin was used, or if the composition did not contain the other components as described in the present invention, a bismaleimide modified epoxy resin would provide poor peel strength. It should also be noted that the present invention can be applied to other systems. For example, the copper used in the present invention can be replaced with aluminum, chromium, titanium, nickel, gold, silver, etc. And, in addition to polyimide, the present invention can also be applied to many other polymers.

As discussed above, one of the major shortcomings of using bismaleimide in preparing an epoxy based adhesive composition is the incompatibility between bismaleimide and the elastomers which must be observed on a long term basis. Unexpected superior results were achieved when bismaleirnide is modified with barbituric acid. Results from the two examples showed that, when bismaleimide was replaced with the barbituric acid modified bismaleimide, not only the excellent heat resistance of bismaleimide was retained, the resultant varnish also exhibited excellent storage stability. Their results, which were obtained under conditions similar to those of Example 1 of the Specification, are summarized in Table 1A below:

TABLE 1A

| | Physical Appearance of Adhesive Varnish | |
|---|---|---|
| | with un-modified bismaleimide | the present invention (with barbituric acid modified bismaleimide) |
| After 1 day | homogeneous | homogeneous |
| After 2 days | phase separation | homogeneous |
| After 10 days | phase separation | homogeneous |

Other unexpected superior results were also observed when the bismaleimide was replaced with the barbituric acid modified bismaleimide in preparing the adhesive composition which contained an elastomer flexibilizer. It is believed that these improved properties of the epoxy resin-based adhesive composition of the present invention were related to the improved compatibility between the barbituric modified bismaleimide and the elastomers. The test results are summarized in the following Table 2A:

TABLE 2A

| | Peel Strength (lb/in) | |
|---|---|---|
| | with un-modified bismaleimide | the present invention (with barbituric acid modified bismaleimide) |
| Initial peel strength | 10.1 lb/in | 9.8 lb/in |
| After soldering at 288° C. for 5 min | 1.1 lb/in | 7.1 lb/in |
| After immersing in MEK for 5 min | <1.0 lb/in | 6.9 lb/in |
| After PCT, 121° C., 2 atm for 1 hr | <2.0 lb/in | 7.0 lb/in |

Similar instability problems were observed in other test cases with unmodified bismaleimide, when the adhesive composition contained DDS, DDM, or BAPP as curing agent, or polyester, acrylic, polyamide, polyvinyl butyral as elastomer flexibilizer. These instability problems were removed by replacing the unmodified bismaleimide with barbituric acid modified bismaleimide. The present invention is clearly non-obvious because no prior art reference ever taught or suggested that there would be any compatibility problem between the unmodified bismaleimide and an elastomer flexibilizer in an adhesive varnish which contains an epoxy resin. Thus, there is no incentive to replace the unmodified bismaleimide with the barbituric modified bismaleimide in preparing the epoxy resin based adhesive composition. Furthermore, there is also no teaching or suggestion that can be found in the prior art which indicates that a barbituric acid modified bismaleimide would provide substantially improved compatibility with elastomer flexibilizer than an unmodified bismaleimide.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for preparing an epoxy resin based adhesive composition comprising the step of:
   (a) preparing a first solution containing a barbituric acid modified bismaleimide;
   (b) preparing an MEK solution having a solid content of 30~70 wt %; and
   (c) mixing said first solution with said MEK solution;
   (d) wherein said solid component in said MEK solution comprises:
      (i) 7~25 wt % of carboxylated acrylontrile rubber (CTBN) which contains 19~41 wt % acrylonitrile;
      (ii) 45~70 wt % of an epoxy resin selected from the group consisting of tetraglycidylmethylenedianiline, diglycidyl ortho-phthalate, diglycidyl ether of bisphenol A, epoxy cresol novolac, and a polyglycidyl ether of a novolac other than the epoxy cresol novolac;
      (iii) a hardening agent provided at an equivalent ratio of 0.9~1.1 relative to said epoxy resin; and
      (iv) a catalyst provided in the amount of about 3~7 parts per hundred parts resin.

2. The method for preparing an epoxy resin based adhesive composition according to claim 1 wherein said barbituric acid modified bismaleimide is prepared by reacting a bismaleimide with a barbituric acid or barbituric derivative; and further wherein said bismaleimide is represented by one the following formulas:

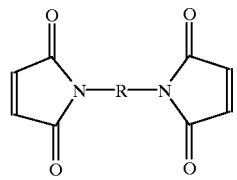

where R is $-(CH_2)_2-$, $-(CH_2)_6-$, $-(CH_2)_8-$, $-(CH_2)_{12}-$,

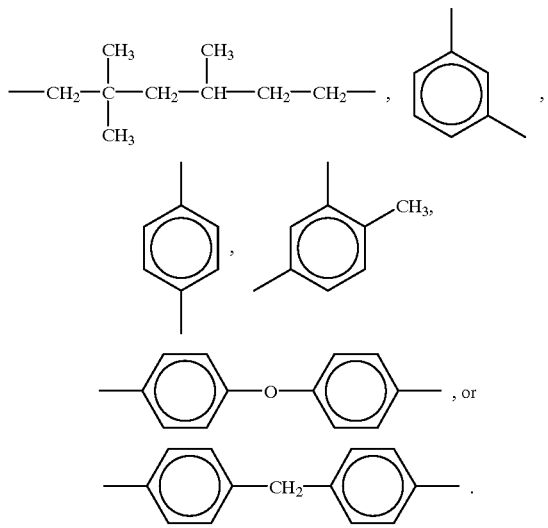

and said barbituric acid or its derivative is represented by the following formula:

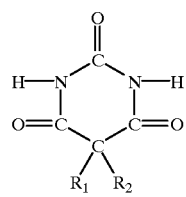

wherein $R_1$ and $R_2$, which can be the same of different, are respectively selected from the group consisting of:

—H, —CH$_3$, —C$_6$H$_5$, —CH(CH$_3$)$_2$, —CH$_2$CH (CH$_3$)$_2$, —CH$_2$CH$_2$CH(CH$_3$)$_2$, and

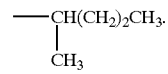

3. The method for preparing an epoxy resin based adhesive composition according to claim 2 wherein said barbituric acid modified bismaleimide is prepared from a process which comprises the steps of:
   (a) adding barbituric acid or its derivative and bismaleimide at a mole ratio of barbituric acid: bismaleimide about of 1:20 to 1:3 into a common solvent;
   (b) causing said barbituric acid and said bismaleimide to react so as to form said barbituric acid modified bismaleimide.

4. The method for preparing an epoxy resin based adhesive composition according to claim 3 wherein:
   (a) said common solvent is a mixture of methyl ethyl ketone and γ-butyrolactone which is mixed with said barbituric acid and said bismaleimide to reach a solid content of 30~60 wt %; and
   (b) said barbituric acid and said bismaleimide are caused to react at a temperature between about 100 and about 130° C. for about 1~6 hours.

5. The method for preparing an epoxy resin based adhesive composition according to claim 1 wherein said epoxy resin based adhesive composition has a total solid content of about 40 to 50 wt %.

6. The method for preparing an epoxy resin based adhesive composition according to claim 1 wherein said hardening agent is selected from the group consisting of ethylenediamine, m-phenylene diamine, trimellitic acid glycol, polymercaptan and a mixture of methyltetrahydrophthalic anhydride (MTHPA) and ethylene glycol.

7. The method for preparing an epoxy resin based adhesive composition according to claim 1 wherein said catalyst is 1 benzyl-2-methylimidazole or 1-cyanoethyl-2-ethyl-4-methylimidazole.

8. The method for preparing an epoxy resin based adhesive composition according to claim 1 which comprises the step of adding a surface active agent a coupling agent, an anti-foaming agent, and a UV-stabilizer into said epoxy resin based adhesive composition.

* * * * *